(12) United States Patent
Kim et al.

(10) Patent No.: US 10,750,170 B2
(45) Date of Patent: Aug. 18, 2020

(54) IMAGE FILTERING METHOD AND DEVICE IN IMAGE CODING SYSTEM

(71) Applicant: LG Electronics Inc., Seoul (KR)

(72) Inventors: Chulkeun Kim, Seoul (KR); Junghak Nam, Seoul (KR)

(73) Assignee: LG Electronics Inc., Seoul (KR)

(*) Notice: Subject to any disclaimer, the term of this patent is extended or adjusted under 35 U.S.C. 154(b) by 98 days.

(21) Appl. No.: 15/737,607

(22) PCT Filed: Feb. 2, 2016

(86) PCT No.: PCT/KR2016/001141
§ 371 (c)(1),
(2) Date: Dec. 18, 2017

(87) PCT Pub. No.: WO2016/204374
PCT Pub. Date: Dec. 22, 2016

(65) Prior Publication Data
US 2018/0160116 A1    Jun. 7, 2018

Related U.S. Application Data

(60) Provisional application No. 62/181,732, filed on Jun. 18, 2015.

(51) Int. Cl.
*H04N 19/117* (2014.01)
*H04N 19/105* (2014.01)
(Continued)

(52) U.S. Cl.
CPC ......... *H04N 19/117* (2014.11); *H04N 19/105* (2014.11); *H04N 19/13* (2014.11);
(Continued)

(58) Field of Classification Search
CPC .. H04N 19/117; H04N 19/176; H04N 19/174; H04N 19/172; H04N 19/13;
(Continued)

(56) References Cited

U.S. PATENT DOCUMENTS 10,063,887 B2 * 8/2018 Nam .................... H04N 19/182
2002/0110269 A1 * 8/2002 Floeder ................. G01N 21/89
382/141
(Continued)

FOREIGN PATENT DOCUMENTS

KR   20130030294    3/2013
KR   20130051029    5/2013
(Continued)

OTHER PUBLICATIONS

Partial Supplementary European Search Report in European Appln. No. 16811787.7, dated Feb. 8, 2019, 16 pages.
(Continued)

*Primary Examiner* — John W Lee
(74) *Attorney, Agent, or Firm* — Fish & Richardson P.C.

(57) ABSTRACT

A picture filtering method performed by an encoding device, according to the present invention, comprises the steps of: deriving, from a current picture, regions for adaptive loop filtering (ALF); deciding ALF coefficients by picture unit or region unit; on the basis of the ALF coefficients, determining, by region unit, whether ALF is usable; re-deciding ALF coefficients for an ALF-usable first region; deriving a filter shape for the first region; on the basis of the re-decided ALF coefficients, determining, by unit of coding units (CUs) in the first region, whether ALF is usable; performing filtering for ALF-usable CUs on the basis of the derived filter shape and the re-decided ALF coefficients; and transmitting at least one among information on the ALF-usable first region and information on the ALF-usable CUs. According to the present invention, efficient filtering appropriate for image properties per region may be applied.

2 Claims, 10 Drawing Sheets

(51) Int. Cl.
  *H04N 19/13*   (2014.01)
  *H04N 19/82*   (2014.01)
  *H04N 19/85*   (2014.01)
  *H04N 19/174*  (2014.01)
  *H04N 19/176*  (2014.01)
  *H04N 19/172*  (2014.01)
  *H04N 19/124*  (2014.01)
  *H04N 19/513*  (2014.01)

(52) U.S. Cl.
  CPC ......... *H04N 19/172* (2014.11); *H04N 19/174* (2014.11); *H04N 19/176* (2014.11); *H04N 19/82* (2014.11); *H04N 19/85* (2014.11); *H04N 19/124* (2014.11); *H04N 19/513* (2014.11)

(58) Field of Classification Search
  CPC ...... H04N 19/105; H04N 19/85; H04N 19/82; H04N 19/513; H04N 19/124
  See application file for complete search history.

(56) References Cited

U.S. PATENT DOCUMENTS

| | | | |
|---|---|---|---|
| 2006/0098879 A1* | 5/2006 | Kim | G09G 3/3611 382/233 |
| 2011/0026600 A1* | 2/2011 | Kenji | H04N 19/172 375/240.24 |
| 2012/0039383 A1 | 2/2012 | Huang et al. | |
| 2012/0213271 A1* | 8/2012 | Chong | H04N 19/96 375/240.02 |
| 2013/0089135 A1* | 4/2013 | Chen | H04N 19/70 375/240.02 |
| 2013/0136371 A1* | 5/2013 | Ikai | H04N 19/593 382/224 |
| 2013/0243104 A1* | 9/2013 | Chen | H04N 19/51 375/240.29 |
| 2015/0063453 A1* | 3/2015 | Kang | H04N 19/46 375/240.12 |
| 2016/0234492 A1* | 8/2016 | Li | H04N 19/117 |

FOREIGN PATENT DOCUMENTS

| | | |
|---|---|---|
| KR | 20130070191 | 6/2013 |
| KR | 20140116992 | 10/2014 |

OTHER PUBLICATIONS

Tsai et al., "Adaptive Loop Filtering for Video Coding," IEEE Journal of Selected Topics in Signal Processing, Dec. 2013, 7(6): 934-945.

Kim, "HM7: High Efficiency Video Coding (HEVC) Test Model 7 Encoder Description," JCTVC-I1002, Joint Collaborative Team on Video Coding (JCT-VC) of ITU-T SG16 WP3 and ISO/IEC JTC1/SC29/WG11, 9th Meeting: Geneva, CH, Apr. 27-May 7, 2012, 42 pages.

Bross, "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, 7th Meeting: Geneva, CH, Nov. 21-30, 2011, 226 pages.

\* cited by examiner

IMAGE FILTERING METHOD AND DEVICE IN IMAGE CODING SYSTEM

CROSS-REFERENCE TO RELATED APPLICATIONS

This application is the National Stage filing under 35 U.S.C. 371 of International Application No. PCT/KR2016/001141, filed on Feb. 2, 2016, which claims the benefit of U.S. Provisional Application No. 62/181,732 filed on Jun. 18, 2015, the contents of which are all hereby incorporated by reference herein in their entirety.

BACKGROUND OF THE INVENTION

Field of the Invention

The present invention relates to an image coding technology and, more particularly, to a method and apparatus for filtering an image in an image coding system.

Related Art

The need for images of high resolution and high quality has recently been increasing in various fields. As the resolution and quality of an image is improved, the amount of data in the image is also likewise increased.

Due to the increase in the amount of information, devices with various performance and networks of various environments are emerging. With the emergence of devices with diverse capabilities and networks of diverse environments, it has become possible to use the same content at varying levels of quality.

Specifically, due to the fact that the image quality that the terminal device can support is diversified, and the network environment that is constructed becomes various, in some environments, images of general quality are used, while, in other environments, images of higher quality are available.

For example, a consumer who purchases video content from a mobile terminal may view the same video content on a larger screen and with a higher resolution using a large screen for home use.

In recent years, as broadcasts with FHD (Full High Definition) resolution are being served, many users are already becoming accustomed to high resolution, high quality images, etc. In addition to FHD, service providers and users are paying attention to UHD (Ultra High Definition) or better services.

As a result, an image filtering method for enhancing a subjective/objective image quality is required.

SUMMARY OF THE INVENTION

The present invention provides a method and a device for enhancing image coding efficiency.

Another object of the present invention is to provide a method and apparatus for improving subjective/objective picture quality of an image.

Yet another object of the present invention is to provide a method and apparatus for filtering an image.

Yet another object of the present invention is to provide a method and apparatus for filtering a picture for each region.

In accordance with an embodiment of the present invention, there is provided a picture filtering method performed by an encoding apparatus. The method includes the steps of deriving regions for adaptive loop filtering (ALF) from a current picture, determining ALF coefficients in a picture unit or region unit, determining whether the ALF is available in a region unit based on the ALF coefficients, redetermineing ALF coefficients with respect to a first region for which the ALF is available, deriving a filter shape for the first region, determining whether the ALF is available in a coding unit (CU) unit within the first region based on the redetermined ALF coefficients, perform filtering on an ALF-available CU based on the derived filter shape and the redetermined ALF coefficients, and transmitting at least one of information about the first region for which the ALF is available and information about the ALF-available CU.

In accordance with another embodiment of the present invention, there is provide an encoding apparatus performing picture filtering. The encoding apparatus includes a filtering unit deriving regions for adaptive loop filtering (ALF) from a current picture, determining ALF coefficients in a picture unit or region unit, determining whether the ALF is available in a region unit based on the ALF coefficients, redetermineing ALF coefficients with respect to a first region for which the ALF is available, deriving a filter shape for the first region, determining whether the ALF is available in a coding unit (CU) unit within the first region based on the redetermined ALF coefficients, and performing filtering on an ALF-available CU based on the derived filter shape and the redetermined ALF coefficients, and an encoding unit encoding at least one of information about the first region for which the ALF is available and information about the ALF-available CU and outputting the information.

In accordance with yet another embodiment of the present invention, there is provided a picture filtering method performed by a decoding apparatus. The method includes the steps of parsing a region ALF-available flag indicating that adaptive loop filtering (ALF) is performed based a region, parsing information about regions for the ALF if the region ALF-available flag is 1, deriving the regions for the ALF from a current picture based on the information about the regions, parsing information about the ALF-available region, deriving a filter shape and ALF coefficients for a current region if the current region of the derived regions is available for the ALF based on the information about the ALF-available region, and performing filtering on the current region based on the filter shape and the ALF coefficients.

In accordance with yet another embodiment of the present invention, there is provided a decoding apparatus performing picture filtering. The decoding apparatus includes a decoding unit receiving a bitstream, parsing a region ALF-available flag indicating that adaptive loop filtering (ALF) is performed based a region, and parsing information about regions for the ALF if the region ALF-available flag is 1, and a filter unit deriving the regions for the ALF from a current picture based on the information about the regions, parsing information about the ALF-available region, deriving a filter shape and ALF coefficients for a current region if the current region of the derived regions is available for the ALF based on the information about the ALF-available region, and performing filtering on the current region based on the filter shape and the ALF coefficients.

In accordance with the present invention, subjective/objective picture quality can be improved through the filtering of a reconstructed picture, and coding efficiency can be improved. Furthermore, efficient filtering suitable for image characteristics for each region can be applied because whether or not to apply a filter, a filter shape and a filter coefficient can be adaptively determined based on a region. Furthermore, a picture filtered as described above can be stored in the memory and used as a reference picture for another picture. In this case, inter-prediction efficiency can be improved.

DESCRIPTION OF EXEMPLARY EMBODIMENTS

Figure 1:
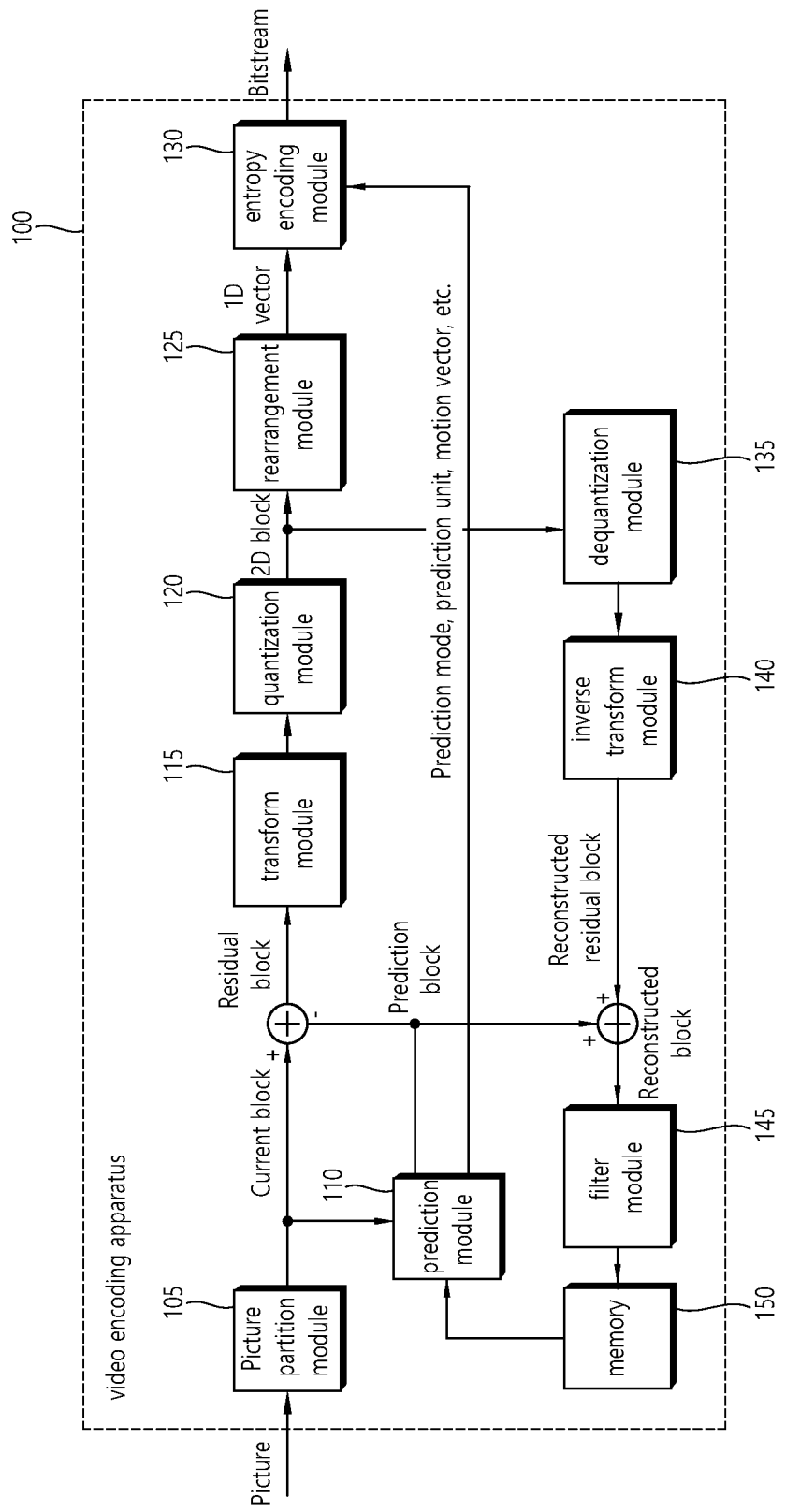
FIG. 1 is a block diagram schematically illustrating a video encoder according to an embodiment of the invention.

The present invention can be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding device and does not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, exemplary embodiments of the invention will be described in detail with reference to the accompanying drawings.

FIG. 1 is a block diagram schematically illustrating a video encoder according to an embodiment of the invention.

Referring to FIG. 1, a video encoder 100 includes a picture partitioning unit 105, a prediction unit 110, a transform unit 115, a quantization unit 120, a rearrangement unit 125, an entropy encoding unit 130, a dequantization unit 135, an inverse transform unit 140, a filtering unit 145, and memory 150.

The picture partitioning unit 105 may be configured to split the input picture into at least one processing unit block. In this connection, a block as a processing unit may be a prediction unit PU, a transform unit TU, or a coding unit CU. The picture may be composed of a plurality of coding tree unit CTUs. Each CTU may be split into CUs as a quad tree structure. The CU may be split into CUs having a deeper depth as a quad-tree structures. The PU and TU may be obtained from the CU. For example, the PU may be partitioned from a CU into a symmetric or asymmetric square structure. Further, the TU may be split into a quad tree structure from the CU.

The prediction unit 110 includes an inter prediction unit that performs an inter prediction process and an intra prediction unit that performs an intra prediction process, as will be described later. The prediction unit 110 performs a prediction process on the processing units of a picture divided by the picture dividing unit 105 to create a prediction block including a prediction sample or a prediction sample array. In the prediction unit 110, the processing unit of a picture may be a CU, a TU, or a PU. The prediction unit 110 may determine whether the prediction performed on the corresponding processing unit is an inter prediction or an intra prediction, and may determine specific details for example, a prediction mode of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

The inter prediction may use a skip mode, a merge mode, or Advanced Motion Vector Prediction (AMVP). In the inter prediction, a reference picture may be selected for the PU, and a reference block corresponding to the PU may be selected. The reference block may be an integer pixel or sample unit, or a fractional pixel or sample unit. The prediction block is then generated for which the residual signal relative to the current PU is minimized and the motion vector size is minimized.

A prediction block may be generated as an integer pixel unit, or as a fractional pixel unit such as a ½ pixel unit or a ¼ pixel unit. In this connection, a motion vector may also be expressed as a fractional pixel unit.

Information such as the index of the reference picture selected via the inter prediction, the motion vector difference MDV, the motion vector predictor MVP, residual signal, etc., may be entropy encoded and then transmitted to the decoder. When the skip mode is applied, the prediction block may be used as a reconstruction block, so that the residual may not be generated, transformed, quantized, or transmitted.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes, as an example. The non-directional modes may include a DC prediction mode and a planar mode.

In the intra prediction, a prediction block may be constructed after a filter is applied to a reference sample. At this time, it may be determined whether a filter should be applied to a reference sample depending on the intra prediction mode and/or the size of a current block.

Residual values (a residual block or a residual signal) between the constructed prediction block and the original block are input to the transform unit 115. The prediction mode information, the motion vector information, and the like used for the prediction are encoded along with the residual values by the entropy encoding unit 130 and are transmitted to the decoder.

The transform unit 115 performs a transform process on the residual block in the unit of TUs and generates transform coefficients.

A transform block is a rectangular block of samples and is a block to which the same transform is applied. The transform block may be a TU and may have a quad-tree structure.

The transform unit 115 may perform a transform process depending on the prediction mode applied to a residual block and the size of the block.

For example, when intra prediction is applied to a residual block and the residual block has an 4×4 array, the residual block is transformed using discrete sine transform DST. Otherwise, the residual block may be transformed using discrete cosine transform DCT.

The transform unit 115 may construct a transform block of transform coefficients through the transform.

The quantization unit 120 may quantize the residual values, that is, transform coefficients, transformed by the transform unit 115 and may create quantization coefficients. The values calculated by the quantization unit 120 may be supplied to the dequantization unit 135 and the rearrangement unit 125.

The rearrangement unit 125 may rearrange the transform coefficients supplied from the quantization unit 120. By rearranging the quantization coefficients, it is possible to enhance the encoding efficiency in the entropy encoding unit 130.

The rearrangement unit 125 may rearrange the quantized transform coefficients in the form of a two-dimensional block to the form of a one-dimensional vector through the use of a coefficient scanning method.

The entropy encoding unit 130 may be configured to entropy code the symbol according to a probability distribution based on the quantized transform values rearranged by the rearrangement unit 125 or the encoding parameter value calculated during the encoding process, etc. and then to output a bit stream. The entropy encoding method is a method of receiving a symbol having various values and expressing the symbol as a binary string that can be decoded while removing statistical redundancy thereof.

In this connection, the symbol means the to-be encoded/decoded syntax element, coding parameter, residual signal value and so on. The encoding parameter is required for encoding and decoding. The encoding parameter may contain information that can be inferred during encoding or decoding, as well as information encoded in an encoder and passed to a decoder like the syntax element. The encoding parameter is the information needed to encode or decode the image. The encoding parameter may include statistics or values such as for example, the intra/inter prediction mode, movement/motion vector, reference picture index, coding block pattern, residual signal presence or absence, transform coefficient, quantized transform coefficient, quantization parameter, block size, block partitioning information, etc. Further, the residual signal may mean a difference between an original signal and a prediction signal. Further, the difference between the original signal and the prediction signal may be transformed to define the residual signal, or the difference between the original signal and the prediction signal may be transformed and quantized to define the residual signal. The residual signal can be called the residual block in the block unit, and can be called the residual sample in the sample unit.

When the entropy encoding is applied, the symbols may be expressed so that a small number of bits are allocated to a symbol having a high probability of occurrence, and a large number of bits are allocated to a symbol having a low probability of occurrence. This may reduce the size of the bit string for the to-be-encoded symbols. Therefore, the compression performance of image encoding may be increased via the entropy encoding.

Encoding schemes such as exponential Golomb, Context-Adaptive Variable Length Coding (CAVLC), and Context-Adaptive Binary Arithmetic Coding (CABAC) may be used for the entropy encoding. For example, the entropy encoding unit 130 may store therein a table for performing entropy encoding, such as a variable length coding/code (VLC) table. The entropy encoding unit 130 may perform entropy encoding using the stored VLC table. Further, the entropy encoding unit 130 derives a binarization method of a corresponding symbol and a probability model of a corresponding symbol/bin, and then performs entropy encoding using the derived binarization method or probability model.

The entropy encoding unit 130 may give a predetermined change to a parameter set or syntaxes to be transmitted, if necessary.

The dequantization unit 135 dequantizes the values transform coefficients quantized by the quantization unit 120. The inverse transform unit 140 inversely transforms the values dequantized by the dequantization unit 135.

The residual value or residual sample or residual sample array generated by the dequantization unit 135 and the inverse-transform unit 140, and the prediction block predicted by the prediction unit 110 may be combined to form a reconstructed block including a reconstructed sample or a reconstructed sample array.

In FIG. 1, a residual block and a prediction block are added to create a reconstructed block by an adder. At this time, the adder may be considered as a particular unit reconstructed block creating unit that generates a reconstructed block.

The filtering unit 145 applies a deblocking filter, an ALF Adaptive Loop Filter, an SAO Sample Adaptive Offset to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filtering unit 145 may not perform a filtering operation on the reconstructed block used in the inter prediction.

The memory 150 may store the reconstructed block or picture calculated by the filtering unit 145. The reconstructed block or picture stored in the memory 150 may be supplied to the prediction unit 110 that performs the inter prediction.

Figure 2:
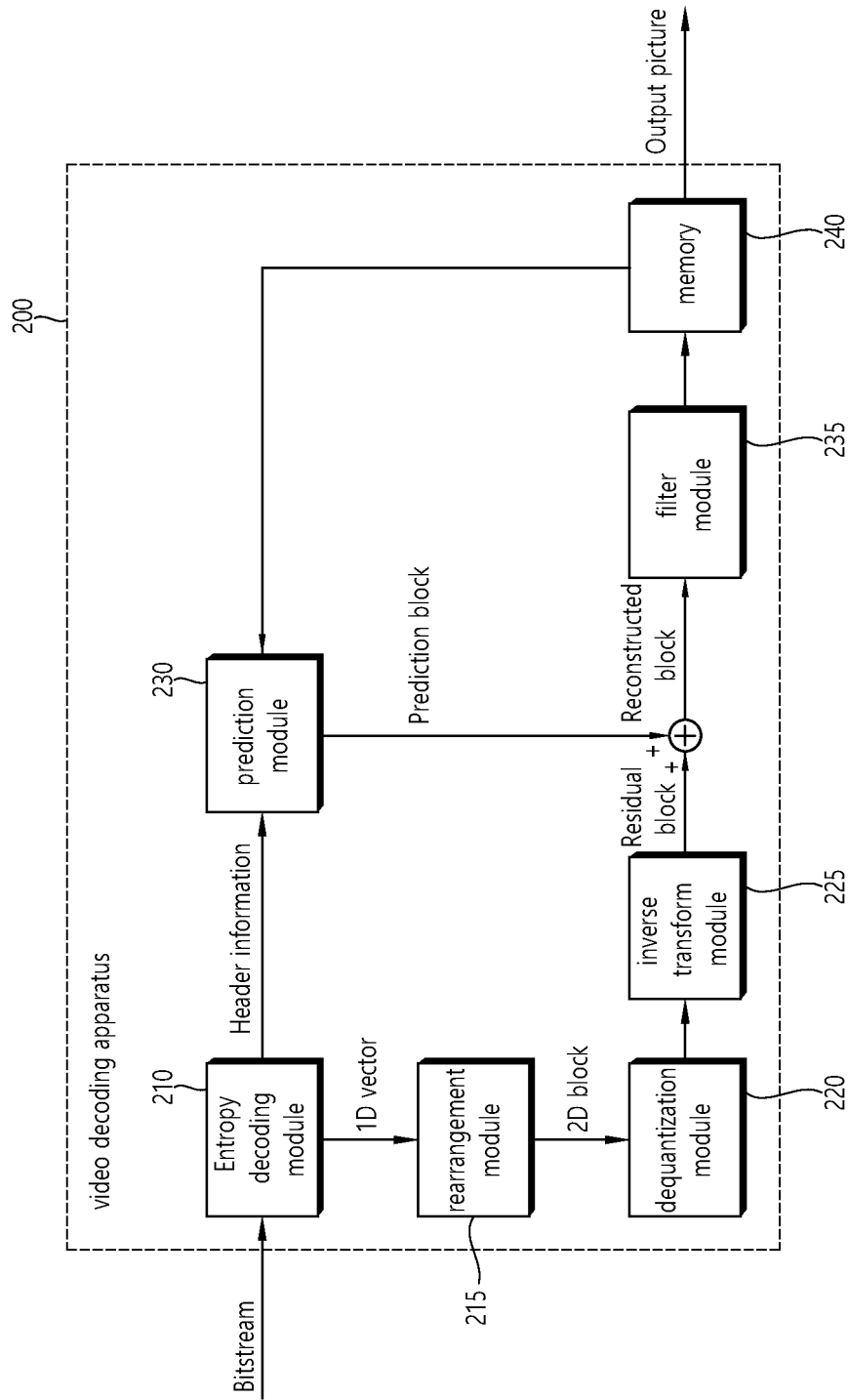
FIG. 2 is a block diagram schematically illustrating a video decoder according to an embodiment of the invention.

FIG. 2 is a block diagram schematically illustrating a video decoder according to an embodiment of the invention. Referring to FIG. 2, a video decoder 200 may include an entropy decoding unit 210, a rearrangement unit 215, a dequantization unit 220, an inverse transform unit 225, a prediction unit 230, a filtering unit 235, and memory 240.

When a video bitstream is input from the video encoder, the input bitstream may be decoded on the basis of the order in which video information is processed by the video encoder.

The entropy decoding unit 210 may entropy-decode the input bitstream according to a probability distribution to generate symbols in a quantized coefficient form. The entropy decoding method is a method of receiving a sequence of binary numbers and generating each of the symbols using the sequence. The entropy decoding method is similar to the entropy encoding method described above.

For example, when a Variable Length Coding VLC (hereinafter referred to as 'VLC') such as CAVLC is used to perform entropy encoding in a video encoder, the entropy decoding unit 210 may perform decoding using the same VLC table as the encoder used in the encoder. Further, when CABAC is used to perform entropy encoding in a video encoder, the entropy decoding unit 210 may perform the entropy decoding using CABAC.

More specifically, the CABAC entropy decoding method may include receiving a bin corresponding to each syntax element in a bitstream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information for constructing a predicted block out of the information decoded by the entropy decoding unit 210 may be supplied to the prediction unit 230, and the residual values, that is, the quantized transform coefficients, entropy-decoded by the entropy decoding unit 210 may be input to the rearrangement unit 215.

The rearrangement unit 215 may rearrange the bitstream information, that is, the quantized transform coefficients, entropy-decoded by the entropy decoding unit 210 on the basis of the rearrangement method in the video encoder.

The rearrangement unit 215 may reconstruct and rearrange the coefficients expressed in the form of a one-dimensional vector into coefficients in the form of a two-dimensional block. The rearrangement unit 215 may scan the coefficients on the basis of the prediction mode applied to the current block transform block and the size of the transform block and may create an array of coefficients quantized transform coefficients in the form of a two-dimensional block.

The dequantization unit 220 may perform dequantization on the basis of the quantization parameters supplied from the video encoder and the coefficient values of the rearranged block.

The inverse transform unit 225 may perform the inverse DCT and/or inverse DST of the DCT and/or DST, which has been performed by the transform unit of the video encoder, on the quantization result from the video encoder.

The inverse transform may be performed on the basis of a transfer unit or a partition unit of a picture determined by the video encoder. The transform unit of the video encoder may selectively perform the DCT and/or DST depending on plural information pieces such as the prediction method, the size of a current block, and the prediction direction, and the inverse transform unit 225 of the video decoder may perform the inverse transform on the basis of the transform information on the transform performed by the transform unit of the video encoder.

The prediction unit 230 generates a prediction block including a prediction sample or a prediction sample array based on the prediction block generation-related information provided by the entropy decoding unit 210 and the previously decoded block and/or picture information provided from the memory 240.

If the prediction mode for the current PU is the intra prediction mode, the prediction unit 230 may perform the intra prediction to generate a prediction block based on pixel information in the current picture.

If the prediction mode for the current PU is the inter prediction mode, the prediction unit 230 may be configured to perform inter prediction on a current PU based on information included in at least one picture of a previous picture or a subsequent picture to the current picture. In this connection, information about the motion information necessary for inter prediction of the current PU provided in the video encoder, such as motion vector and reference picture index may be deduced via checking the skip flag and merge flag received from the encoder.

The prediction unit 230 may generate a prediction block such that the residual signal relative to the current block is minimized and the motion vector size is minimized when inter prediction is performed on the current picture.

On the other hand, the motion information derivation method may be changed according to the prediction mode of the current block. The prediction mode applied to inter prediction may include an Advanced Motion Vector Prediction (AMVP) mode, a merge mode, and the like.

For example, when a merge mode is applied, the encoding apparatus and the decoding apparatus may generate a merge candidate list using the motion vector of the reconstructed spatial neighboring block and/or the motion vector corresponding to the Col block which is a temporally neighboring block. In the merge mode, the motion vector of the candidate block selected in the merge candidate list is used as the motion vector of the current block. The encoding apparatus may transmit a merge index indicating a candidate block having an optimal motion vector selected from the candidate blocks included in the merge candidate list to the decoder. In this case, the decoder may derive the motion vector of the current block using the merge index.

In another example, when the AMVP (Advanced Motion Vector Prediction) mode is applied, the encoder and decoder generate a motion vector predictor candidate list using a motion vector of a reconstructed spatial neighboring block and/or a motion vector corresponding to a Col block as a temporal neighboring block. That is, the motion vector of the reconstructed spatial neighboring block and/or the motion vector corresponding to the Col block as a temporal neighboring block may be used as a motion vector candidate. The encoder may transmit to the decoder a prediction motion vector index indicating the optimal motion vector selected from among the motion vector candidates included in the motion vector predictor candidate list. In this connection, the decoder may select the prediction motion vector for the current block from the motion vector candidates included in the motion vector candidate list using the motion vector index.

The encoder may obtain the motion vector difference MVD between the motion vector for the current block and the motion vector predictor (MVP), encode the MVD, and transmit the encoded MVD to the decoder. That is, the MVD may be a value obtained by subtracting the motion vector predictor (MVP) from the motion vector (MV) for the current block. In this connection, the decoder may decode the received motion vector difference, and derive the motion vector for the current block via addition between the decoded motion vector difference and the motion vector predictor.

Further, the encoder may transmit a reference picture index indicating a reference picture to the decoder.

The decoder may predict the motion vector of the current block using the motion information of the neighboring block and derive the motion vector of the current block using the residual received from the encoder. The decoder may generate the prediction block for the current block based on the derived motion vector and the reference picture index information received from the encoder.

In another example, when the merge mode is applied, the encoder and decoder may generate a merge candidate list using the motion information of the reconstructed neighboring block and/or the motion information of the Col block. That is, when the reconstructed neighboring block and/or the motion information of the Col block exists, the encoder and decoder may use the reconstructed neighboring block and/or the motion information of the Col block as a merge candidate for the current block.

The encoder may select a merge candidate that provides optimal encoding efficiency among the merge candidates included in the merge candidate list as the motion information for the current block. In this connection, a merge index indicating the selected merge candidate may be included in the bitstream which is transmitted to the decoder. The decoder may select one of the merge candidates included in the merge candidate list using the transmitted merge index, and the decoder may determine the selected merge candidate as motion information of the current block. Therefore, when the merge mode is applied, the motion information of the reconstructed neighboring block and/or the Col block may be used as the motion information for the current block as it is. The decoder may reconstruct the current block by adding the prediction block and the residual transmitted from the encoder to each other.

In the above-described AMVP and merge modes, motion information of the reconstructed neighboring block and/or motion information of the Col block may be used to derive motion information of the current block.

In the skip mode, which is one of the other modes used for inter-picture prediction, neighboring block information may be used for the current block as it is. Therefore, in the case of skip mode, the encoder does not transmit syntax information such as the residual to the decoder in addition to information indicating which block's motion information to use as the motion information for the current block.

The encoder and the decoder may generate a prediction block of the current block by performing motion compensation on the current block based on the derived motion information. In this connection, a prediction block may refer to a motion-compensated block as generated by performing motion compensation on the current block. Further, a plurality of motion compensated blocks may constitute a single motion compensated image.

The reconstructed block may be generated using the prediction block generated by the prediction unit 230 and the residual block provided by the inverse-transform unit 225. FIG. 2 illustrates that using the adder, the prediction block and the residual block are combined to generate the reconstructed block. In this connection, the adder may be viewed as a separate unit (a reconstructed block generation unit) that is configured to generate the reconstructed block. In this connection, the reconstructed block includes a reconstructed sample or a reconstructed sample array as described above; the prediction block includes a prediction sample or a prediction sample array; the residual block may include a residual sample or a residual sample array. Therefore, the reconstructed sample or the reconstructed sample array can be considered to be generated by combining the corresponding prediction sample or prediction sample array with the corresponding residual sample or residual sample array.

When the skip mode is used for a block, the residual signal may not be transmitted and the predicted block may be used as a reconstructed block.

The reconstructed block and/or picture may be supplied to the filtering unit 235. The filtering unit 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output unit.

The elements that is directly related to decoding images among the entropy decoding unit 210, the rearrangement unit 215, the dequantization unit 220, the inverse transform unit 225, the prediction unit 230, the filtering unit 235 and the memory 240 which are included in the decoding apparatus 200, for example, the entropy decoding unit 210, the rearrangement unit 215, the dequantization unit 220, the inverse transform unit 225, the prediction unit 230, the filtering unit 235, and so on may be expressed as a decoder or a decoding unit that is distinguished from other elements.

In addition, the decoding apparatus 200 may further include a parsing unit not shown in the drawing that parses information related to the encoded images included in a bitstream. The parsing unit may include the entropy decoding unit 210, and may be included in the entropy decoding unit 210. Such a parsing unit may also be implemented as an element of the decoding unit.

An in-loop filter may be applied to the reconstructed picture to compensate for a difference between an original picture and the reconstructed picture due to an error occurring in a compression coding process such as quantization, or the like. As described above, in-loop filtering may be performed in filter units of the encoder and decoder, and the filter units may apply a deblocking filter, a sample adaptive offset (SAO) and/or adaptive loop filter to the reconstructed picture. Here, the ALF may perform filtering based on a value obtained by comparing the reconstructed picture with the original picture after the deblocking filtering and/or the SAO process is performed. The ALF may adaptively a Wiener filter to the reconstructed picture after the deblocking filtering and/or the SAO process is performed. That is, the ALF may compensate for an encoding error using the Wiener filter.

A filter used in ALF may be determined based on a filter shape and filter coefficient that are used. That is, the encoding apparatus and the decoding apparatus may perform filtering based on a filter shape and a filter coefficient. The filter shape indicates the shape/size of a filter used. That is, one of a plurality of specific filter shapes may be used for each target region. For example, in the case of ALF, several filter shapes and sizes, such as an n×n star shape and an m×n cross shape, may be used as filter shapes. In this case, n and m are positive integers, and n and m may be the same or different. In this case, the filter shape may be represented as various expressions, such as a filter size, a filter type and a filter mode.

Figure 3:
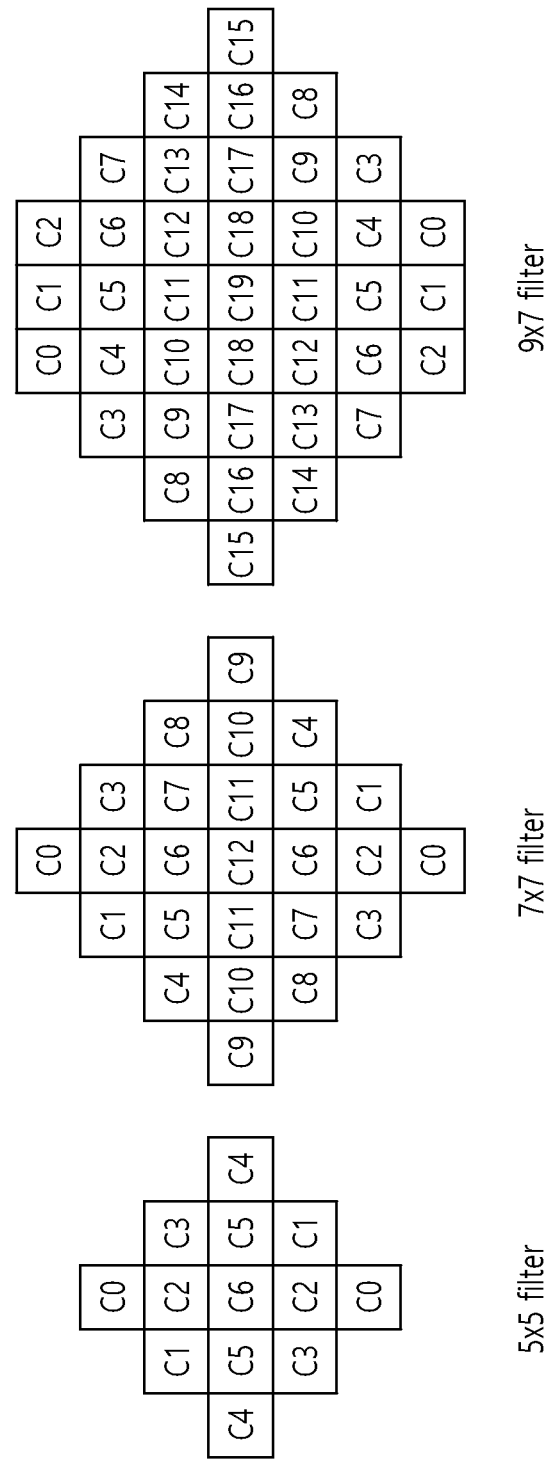
FIG. 3 is a diagram showing embodiments of filter shapes according to the present invention.

FIG. 3 is a diagram showing embodiments of filter shapes according to the present invention.

As described above, in performing filtering according to the present invention, the encoding apparatus and the decoding apparatus may select one of filters of specific filter shapes and use the selected filter. That is, the encoding apparatus and the decoding apparatus may perform filtering based on a filter selected from filters of specific filter shapes.

The filters may have filter shapes, such as those shown in FIG. 3.

Meanwhile, in accordance with the present invention, a filter coefficient may be assigned depending on a filter shape. Hereinafter, in this specification, the position and/or unit to which each filter coefficient is assigned may be called a filter tab. In this case, one filter coefficient may be assigned to each filter tab, and a form in which filter tabs are arranged may correspond to a filter shape.

Furthermore, hereinafter, in this specification, a filter tab located at the center of a filter shape may be called a center filter tab. The filter tabs are symmetrical around the center filter tab located at the center of the filter shape. For example, the filter tabs may be numbered in raster scan order, and may be numbered in ascending order from the beginning to the center tab and may be numbered in descending order from the center tab to the end. The remaining filter coefficients other than the filter coefficient assigned to the center filter tab may be identically assigned to two filter tabs at corresponding locations based on the center filter tab. FIG. 3 shows that C6 is a center tab in the case of a 5×5 filter, C12 is a center tab in the case of a 7×7 filter, and a C19 is center tab in the case of a 9×7 filter.

Meanwhile, such filter shapes and sizes are examples, and filters of various shapes and sizes may be used. The reason why filters of various shapes and sizes are used is that the shape and size of a suitable filter are different depending on image characteristics. In the encoding/decoding process, a filter having the best rate-distortion (RD) cost may be selected and used. Filters of various shapes (and sizes) need to be used for the best filtering because the size of an image used becomes various and in particular, a high-resolution image is used.

The encoding apparatus and/or the decoding apparatus may determine whether or not to perform filtering through a specific process and a filter shape and/or a filter coefficient. Filtering may be applied in order to minimize an error generated in a compression encoding process. A filter shape and/or a filter coefficient may be determined so that the error is minimized. Information about the determined filter may be transmitted to the decoding apparatus. The decoding apparatus may determine a filter shape and/or a filter coefficient based on the transmitted information.

Figure 4:
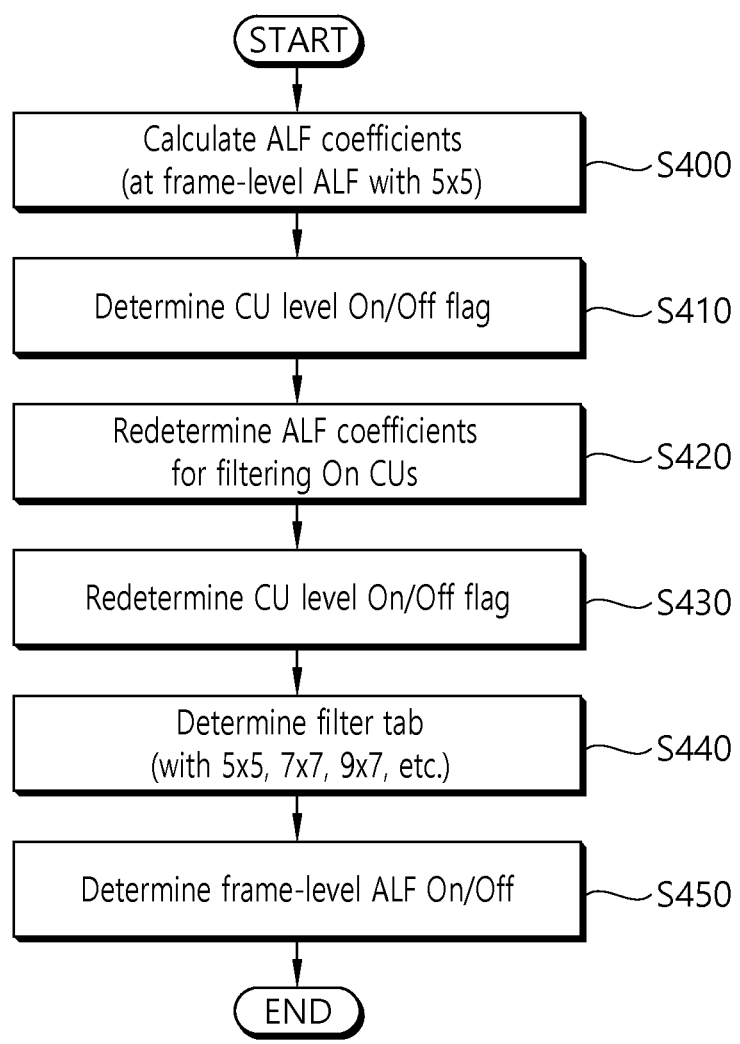
FIG. 4 schematically shows an ALF process performed by the encoding apparatus according to an example of the present invention.

FIG. 4 schematically shows an ALF process performed by the encoding apparatus according to an example of the present invention. In this case, whether or not to apply the ALF may be determined in the frame (or picture) level and CU level. In this case, a filter shape may be determined in the frame level.

Referring to FIG. 4, the encoding apparatus calculates ALF coefficients in the frame (or picture) level (S400). In this case, the encoding apparatus may assume a 5×5 filter as a default filter.

The encoding apparatus determines ALF On/Off in the CU level based on the calculated ALF coefficients and determines (or sets) an ALF On/Off flag in the CU level (S410). The encoding apparatus may calculate an RD cost according to whether or not to apply a filter based on the 5×5 filter and the calculated ALF coefficients with respect to CUs within a current picture, and may determine the ALF On/Off based on the RD cost.

The encoding apparatus redetermines (or recalculates) ALF coefficients with respect to each of the ALF On CUs of the CUs (S420). In this case, the encoding apparatus may determine again suitable ALF coefficients through the calculation of the image characteristics (e.g., activity and/or direction) of a sample and/or a block unit with respect to CUs that are ALF On (i.e., CUs in which the ALF On flag has been set).

The encoding apparatus redetermines the ALF On/Off in the CU level and redetermines the ALF On/Off flag in the CU level (S430). The encoding apparatus may determine the ALF On/Off again with respect to the CUs within the current picture based on the redetermined (or recalculated) ALF coefficients.

For example, at S410, the encoding apparatus may determine the ALF On/Off again with respect to CUs that are ALF Off in addition to CUs that are ALF On, and may determine the flag again. In this case, the ALF On/Off may be determined again based on the ALF coefficients calculated at S430 with respect to the CUs that are ALF On, and the ALF coefficients redetermined with respect to other CUs that are ALF On according to a predetermined criterion may be used with respect to the UEs that are ALF Off. For example, for a CU that is ALF Off, the ALF On/Off may be determined again using the ALF coefficients of a CU that neighbors the corresponding CU and/or that has the same or similar image characteristics, and the flag may be determined again.

For another example, at S410, the encoding apparatus may determine the ALF On/Off again with respect to only CUs that are ALF Off, and may determine the flag again. In this case, although the ALF On/Off is determined again based on calculated ALF coefficients with respect to CUs that are ALF On at S410, ALF On will be determined. Accordingly, computational complexity can be lowered by redetermining the ALF On/Off with respect to only CUs that are ALF Off.

The encoding apparatus determines a filter tab (S440). In this case, the filter tab may be a filter tab for a filter shape, such as 5×5, 7×7 or 9×7, for example. Hereinafter, determining the filter tab may include determining a filter shape (or filter type). The filter tab may be determined in a frame unit. That is, one filter shape and filter tab may be determined and used with respect to a current picture.

The encoding apparatus determines ALF On/Off in the frame level (S450). The encoding apparatus determines the ALF On/Off in the frame level based on the determined filter tab and the ALF coefficients corresponding to the ALF On CUs and the ALF On CUs. That is, although it is better to apply ALF in each CU unit in terms of efficiency, if it is inefficient in terms of the RD cost in all of frame units, the encoding apparatus may determine ALF Off in the frame level.

If ALF On is determined in the frame level at S450, the ALF On/Off flag in the CU level redetermined at S430 may be encoded and signaled to the decoding apparatus through a bitstream. If ALF Off is determined in the frame level at S450, the ALF On/Off flag in the CU level redetermined at S430 may not be signaled to the decoding apparatus. In this case, a flag explicitly indicating ALF Off in the frame level may be transmitted or it may implicitly indicate that ALF is not applied by not transmitting related information.

Meanwhile, if video is divided into regions, there is a region in which a high effect can be obtained by the application of ALF. In contrast, there may be a region in which a high effect cannot be obtained by the application of ALF. Furthermore, there may be a region in which a large filter is suitable and a region in which a small filter is suitable depending on the regions. Accordingly, if whether or not to apply the ALF is determined in the frame level and CU level and a filter tab and filter shape are determined in the frame level as described above, the regional characteristics of an image may not be properly incorporated.

In order to solve such a problem, an image may be divided into a plurality of regions, whether or not to apply a filter to each region may be determined and/or a filter shape (and filter tab) may be determine for each region.

Figure 5:
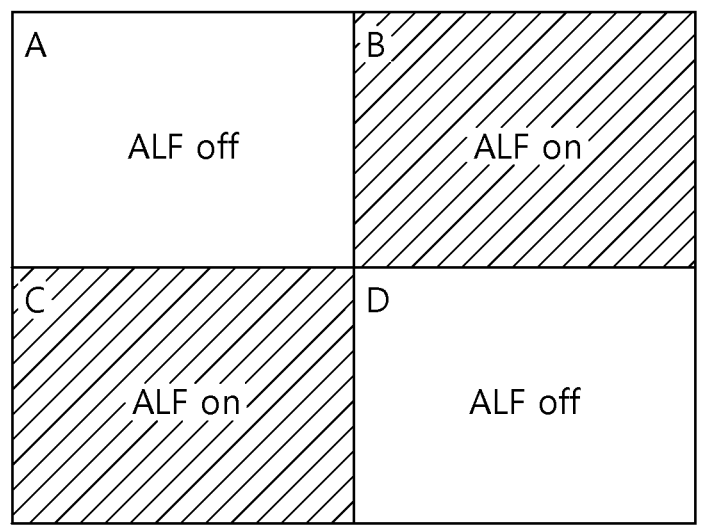
FIG. 5 shows an example of an ALF On/Off application in a region unit.
Figure 6:
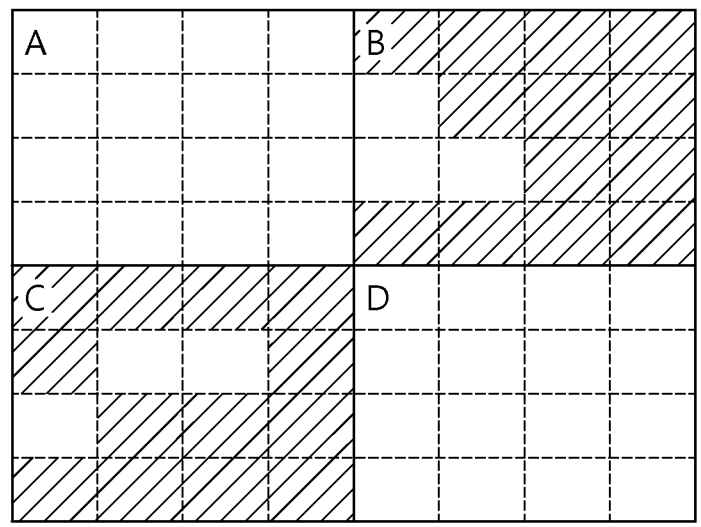
FIG. 6 shows an example of additional On/Off application in a block unit within a region.

FIG. 5 shows an example of an ALF On/Off application in a region unit, and FIG. 6 shows an example of additional On/Off application in a block unit within a region.

Referring to FIG. 5, a current picture may be divided into four regions, for example, and an ALF On/Off determination may be performed for each region. In this case, a region A and a region D indicate ALF-Off regions, and a region B and a region C indicate ALF-On regions.

Meanwhile, referring to FIG. 6, an ALF On/Off determination may be performed on the ALF-On regions in the CU level. In this case, a block within each region corresponds to a CU, a block having a shadow within the region B and the region C indicates an ALF-On CU, and a block not having shadow indicates an ALF-Off CU.

If whether or not to apply a filter and/or a filter shape are determined for each region, an ALF process may be performed as follows.

Figure 7:
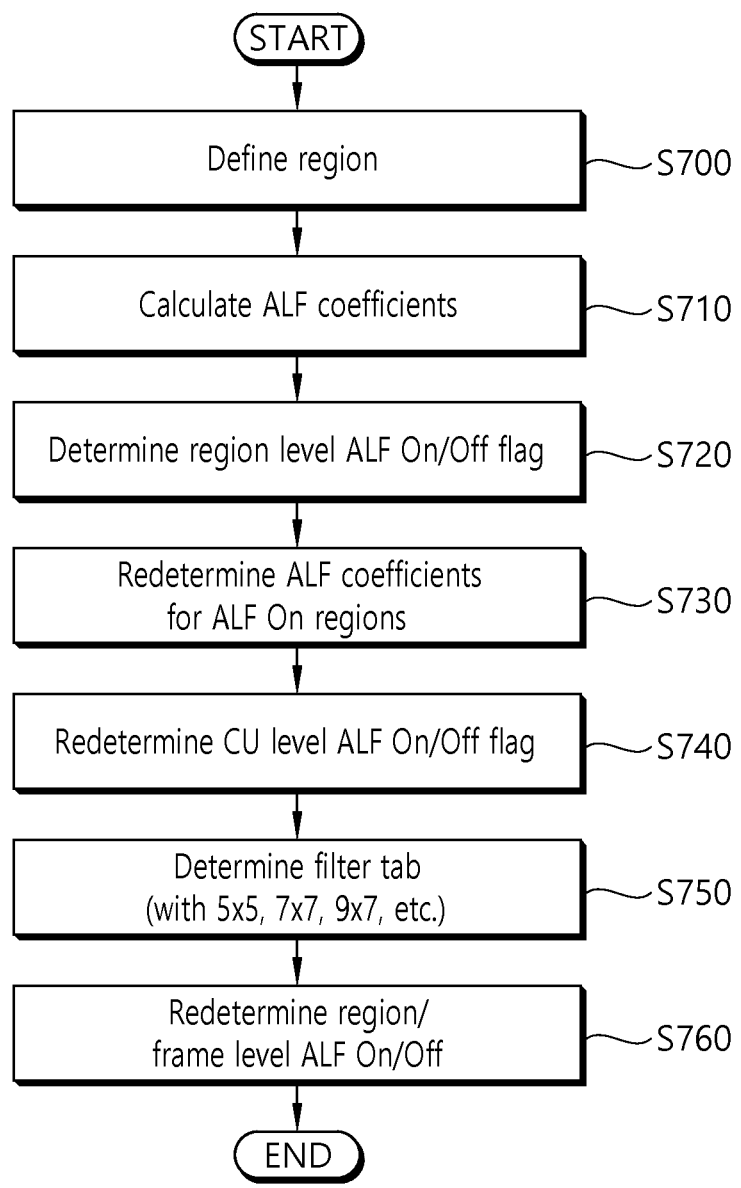
FIG. 7 schematically shows an ALF process performed by the encoding apparatus according to an example of the present invention.

FIG. 7 schematically shows an ALF process performed by the encoding apparatus according to an example of the present invention. In this case, whether or not to apply the ALF may be determined in the frame (or picture) level and the CU level. In this case, a filter shape may be determined in the frame level.

Referring to FIG. 7, the encoding apparatus defines a region (S710). That is, the decoding apparatus defines that a (current) picture will be divided into how many regions. The decoding apparatus may define a picture region in a picture level or sequence level. Alternatively, a predefined region may be used. In this case, step S710 may be omitted. The predefined region may include a CTU, a tile and a slice, for example. In this case, the tile is a square region including CTUs and may be divided based on a specific tile row and a specific tile column. The slice is the sequence of CTUs. CTUs within a slice may be included in an independent slice segment and subsequent dependent slice segments.

The encoding apparatus calculates ALF coefficients (S710). In this case, the encoding apparatus may assume a 5×5 filter as a default filter, may calculate the ALF coefficients in the region level according to a predefined criterion, and may calculate the ALF coefficients in the frame (or picture) level.

The encoding apparatus determines ALF On/Off in the region level based on the calculated ALF coefficients and determines an ALF On/Off flag in the region level (S720). The encoding apparatus may calculate an RD cost according to whether or not to apply a filter based on the calculated ALF coefficients with respect to each of the regions within the current picture, and may determine ALF On/Off based on the RD cost.

The encoding apparatus redetermines the ALF coefficients with respect to the ALF-On regions (S730). For example, the encoding apparatus may determine suitable ALF coefficients again through the calculation of the image characteristics of a sample and/or a block unit with respect to the ALF-On regions (regions in which the Alf On flag has been set).

In this case, the encoding apparatus may redetermine ALF On/Off for an ALF-Off region using the redetermined ALF coefficients with respect to neighbor regions that are ALF On. In this case, ALF coefficients redetermined with respect to another ALF-On region according to a predetermined may be used with respect to the ALF-Off regions. For example, for ALF-Off region, ALF On/Off may be determined again using ALF coefficients that neighbors the corresponding region and/or that has the same or similar image characteristics, and a flag may be determined again.

The encoding apparatus determines the ALF On/Off flag in the CU level with respect to the ALF-On region (S740). The encoding apparatus determines ALF On/Off for CUs within a current region based on the ALF coefficients with respect to the current region, and determines an ALF On/Off flag.

In this case, although not shown, after the ALF On/Off is determined in the CU level, ALF coefficients in the CU level may be determined again and used.

The encoding apparatus determines a filter tab (S750). That is, the encoding apparatus determines a filter shape. In this case, the encoding apparatus may determine the filter shape for each region and may determine the filter shape for each frame (or picture).

The encoding apparatus determines ALF On/Off in the region level or the frame level (S760). The encoding apparatus determines the ALF On/Off in the region level or the frame level based on the determined filter shape, the ALF On CUs and the ALF coefficients. That is, although it is better to apply the ALF in each CU unit in terms of efficiency, if it is inefficient in terms of an RD cost in the entire region unit or frame unit, the encoding apparatus may determine ALF Off in the region or the frame level.

If ALF On is determined at S760, the ALF On flag for the region level and/or the CU level may be encoded and signaled to the decoding apparatus through a bitstream.

Meanwhile, in order to apply the filter to each region, the regions may be defined as follows. The regions may be equally divided depending on the size (or resolution) of a picture and may have different sizes. If the regions have different sizes, portions having similar image characteristics may be defined as one region. A region for ALF may be defined as follows, for example.

TABLE 1

| | |
|---|---|
| region_alf_enabled_flag | u(1) |
| if(region_alf_enabled_flag) { | |
|    num_region_columns_minus1 | ue(v) |
|    num_region_rows_minus1 | uc(v) |
|    uniform_region_flag | u(1) |
|    if( ! uniform_region_flag) { | |
|      for( i = 0; i < num_region_columns_minus1; i++ ) | |
|        region_width_minus1[ i ] | ue(v) |
|      for( i = 0; i < num_region_rows_minus1; i++ ) | |
|        region_height_minus1[ i ] | ue(v) |
|    } | |
| } | |

TABLE 2

Region_ALF_enabled_flag equal to 1 specifies that there is more than one region in each picture referring to the PPS.
region_ALF_enabled_flag equal to 0 specifies that there is only one region in each picture.
num_region_columns_minus1 plus 1 specifies the number of region columns partitioning the picture. num_region_columns_minus1 shall be in the range of 0 to PicWidthInCtbsY − 1, inclusive. When not present, the value of num_region_columns_minus1 is inferred to be equal to 0.
num_region_rows_minus1 plus 1, specifies the number of region rows partitioning the picture. num_region_rows_minus1 shall be in the range of 0 to PicHeightInCtbsY − 1, inclusive. When not present, the value of num_retopm_rows_minus1 is inferred to be equal to 0. When Region_Based_ALF_Enable_Flag is equal to 1, num_region_columns_minus1 and num_region_rows_minus1 shall not be both equal to 0.
uniform_region_flag equal to 1 specifies that region column boundaries and likewise region row boundaries are distributed uniformly across the picture. uniform_region _flag equal to 0 specifies that region column boundaries and likewise region row boundaries are not distributed uniformly across the picture but signalled explicitly using the syntax elements region_width_minus1[i] and region_height_minus1[i].
When not present, the value of uniform_region_flag is inferred to be equal to 1.
region_width_minus1[i] plus 1 specifies the width of the i-th region column in units of coding tree blocks.
region_height_minus1[i] plus 1 specifies the height of the i-th region row in units of coding tree blocks.

Table 1 and Table 2 show a syntax and semantics regarding a region for ALF.

Syntax elements within the syntax of Table 1 may be signaled from the encoding apparatus to the decoding apparatus through a bitstream according to conditions defined in the syntax.

The region_alf_enabled_flag is flag information indicating whether a region for ALF has been used or is available.

If a value of the region_alf_enabled_flag syntax element indicates 1, the num_region_column_minus1, the num_region_rows_minus1 and the uniform_region_flag may be signaled and checked by the decoding apparatus.

The num_region_column_minus1 indicates the number of region columns within a picture. Specifically, +1 of the value of the num_region_column_minus1 syntax element may indicate the number of region columns.

The num_region_rows_minus1 indicates the number of region rows within a picture. Specifically, +1 of the value of the num_region_rows_minus1 syntax element may indicate the number of region rows.

The uniform_region_flag indicates that region row boundaries and region column boundaries within the picture have been uniformly distributed. That is, if a value of the uniform_region_flag syntax element is 1, the regions within the picture may have a uniform size.

If a value of the uniform_region_flag syntax element indicates 0, the region_width_minus1 [i] and the region_height_minus1 [i] may be signaled and checked by the decoding apparatus.

The region_width_minus1 [i] indicates the width of an i-th region column. The width may correspond to the number of CTUs. Specifically, +1 of the value of the region_width_minus1 [i] syntax element may indicate the width of the column.

The region_height_minus1[i] indicates the height of an i-th region row. The height may correspond to the number of CTUs. Specifically, +1 of the value of the region_height_minus1[i] syntax element may indicate the height of the row.

In Table 1, u(1) indicates an unsigned integer using 1 bit, and ue(v) a 0-th order Exponential Colomb-coded syntax element. A syntax element having ue(v) may be encoded/decoded based on Exponential Colomb coding.

Figure 8:
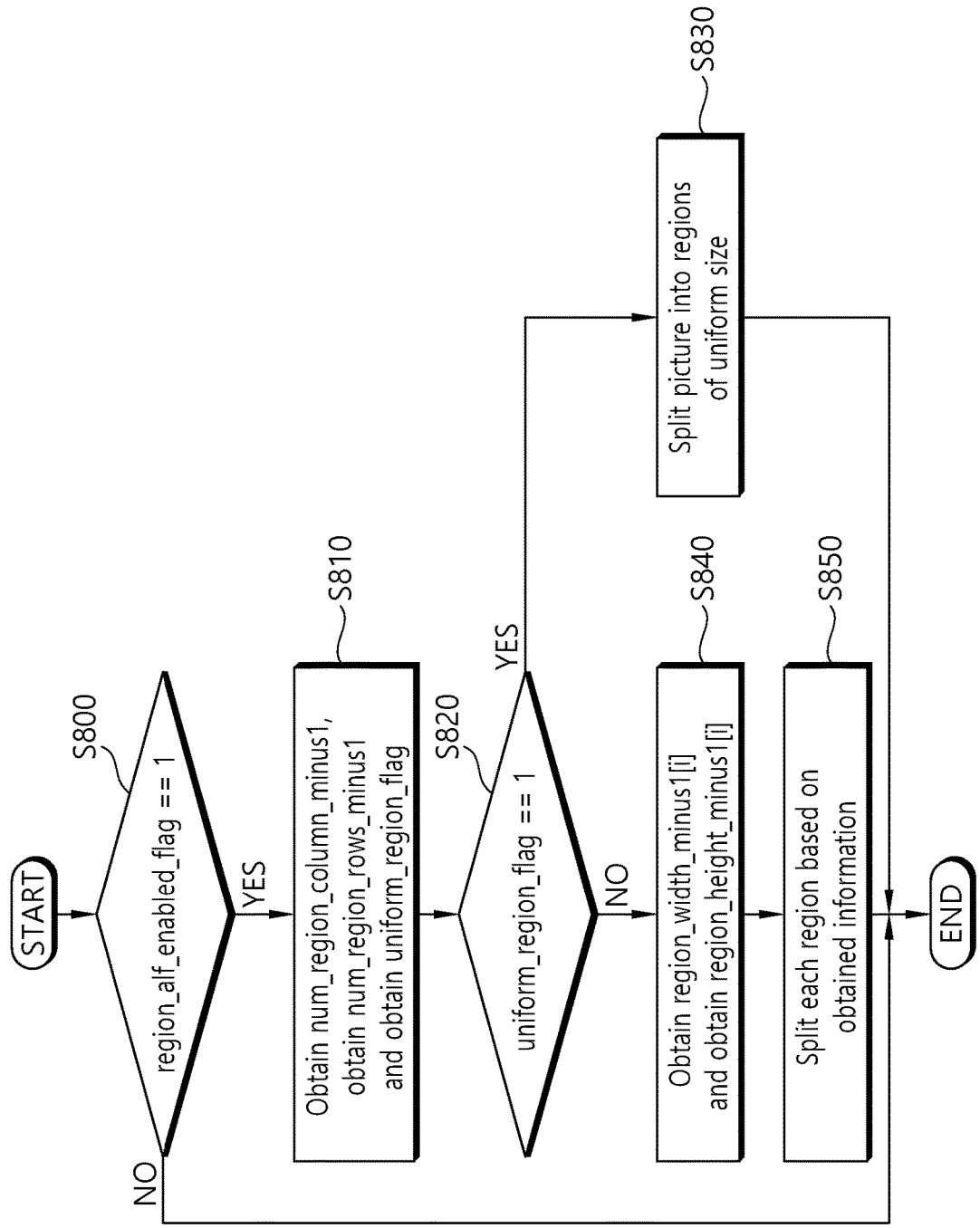
FIG. 8 shows an example of a signaling method of region information for ALF.

FIG. 8 shows an example of a signaling method of region information for ALF. The method disclosed in FIG. 8 may be performed by the decoding apparatus.

Referring to FIG. 8, the decoding apparatus may receive and parse region_alf_enabled_flag and checks whether the region_alf_enabled_flag has a value of 1 (S800).

If the value of the region_alf_enabled_flag is 1 at S800, the decoding apparatus obtains num_region_column_minus1, num_region_rows_minus1 and uniform_region_flag by parsing them in order to derive regions by splitting a picture (S810). The number of region columns and region rows within a current picture can be aware based on the num_region_column_minus1 and the num_region_rows_minus1. For example, if a value of the num_region_column_minus1 is N and a value of the num_region_rows_minus1 is M, the current picture may be split into (N+1)×(M_1) regions. In this case, N and M may be specific integers.

The decoding apparatus checks whether a value of the uniform_region_flag is 1 (S820).

If the value of the uniform_region_flag is 1 at S820, the decoding apparatus splits the picture into regions of a uniform size (S830). That is, if the value of the uniform_region_flag is 1, the decoding apparatus is aware of the number of region columns and region rows within the current picture based on the num_region_column_minus1 and the num_region_rows_minus1, and thus may derive the regions of a uniform size based on the total size of the picture. That is, if the value of the uniform_region_flag is 1, the current picture may be split into the (N+1)×(M+1) regions having a uniform size.

If the value of the uniform_region_flag is 0 at S820, the decoding apparatus obtains region_width_minus1[i] and region_height_minus1[i] by parsing them (S840).

The decoding apparatus may determine the width and height of an i-th region based on the region_width_minus1 [i] and the region_height_minus1[i], and may split each region based on the width and height of the i-th region (S850). For example, if a value of the region_width_minus1 [0] is A and a value of the region_height_minus1 [0] is B, the first region may have a size of (A+1)×(B+1). In this case, (A+1) may indicate the number of CTUs in the horizontal direction, and (B+1) may indicate the number of CTUs in the vertical direction. In this case, A and B may be specific integers.

Figure 9:
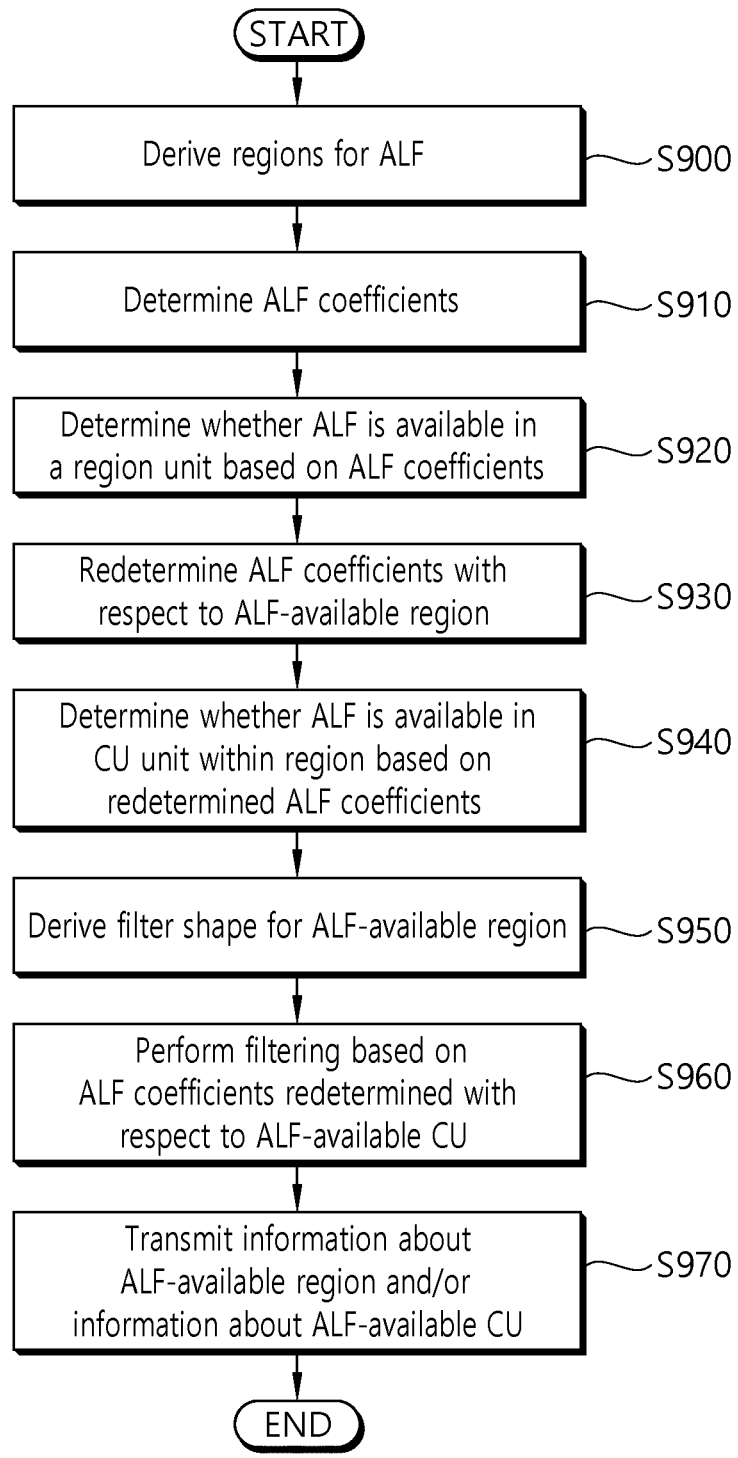
FIG. 9 schematically shows an example of a region-based ALF method according to the present invention.

FIG. 9 schematically shows an example of a region-based ALF method according to the present invention. The method disclosed in FIG. 9 may be performed by the encoding apparatus.

Referring to FIG. 9, the encoding apparatus derives regions for ALF (S900). The regions for ALF may have been previously defined or may be actively determined by the encoding apparatus based on an RD cost.

The encoding apparatus determines ALF coefficients (S910). The encoding apparatus may determine the ALF coefficients in a picture unit or region unit.

The encoding apparatus determines whether ALF is available in a region unit based on the determined ALF coefficients (S920).

The encoding apparatus redetermines ALF coefficients with respect to an ALF-available region (S930). For example, if the first region of the regions is determined to be an ALF-available region, the encoding apparatus redetermines ALF coefficients for the first region. In this case, the encoding apparatus may determine the ALF coefficients again according to a predetermined criterion based on the image characteristics for the first region.

Meanwhile, although the second region of the regions is primarily determined to be a region in which the ALF is not available, the encoding apparatus may redetermine whether the ALF for the second region is available based on the ALF coefficients redetermined for the first region. In this case, the first region may be a spatially neighboring region or temporally neighboring region of the second region. For example, the first region may be a region located at the left or top of the second region within the current picture. Alternatively, the first region may have image characteristics the same or similar to the image characteristics of the second region. For example, the first region may have the same image complexity and/or image direction as the second region.

The encoding apparatus determines whether ALF is available in the CU unit within the region based on the redetermined ALF coefficients (S940). In this case, the encoding apparatus may determine whether ALF is available in the CU unit with respect to the ALF-available regions.

If, as a result of the redetermination, the second region is available for ALF, the encoding apparatus may determine whether ALF is available based on the redetermined ALF coefficients in the CU unit within the second region.

The encoding apparatus derives a filter shape for ALF-available region according to a predetermined criterion (950), and performs filtering based on ALF coefficients redetermined with respect to an ALF-available CU (S960).

The encoding apparatus encodes information about the ALF-available region and/or information about the ALF-available CU and transmits them to the decoding apparatus through a bitstream (S970).

Meanwhile, although not shown, the encoding apparatus may finally determine whether ALF is available in a picture unit. That is, the encoding apparatus may compare an RD cost when the ALF is applied to the current picture based on the redetermined ALF coefficients with an RD cost when the ALF is not applied to the current picture based on the redetermined ALF coefficients, and may not apply the ALF to the current picture if efficiency is low. In this case, the encoding apparatus may transmit a flag, indicating that the ALF is not available for the current picture, to the decoding apparatus.

Furthermore, the encoding apparatus may generate a region ALF-available flag indicating that the ALF is performed based on a region as in the present invention, and may transmit the region ALF-available flag. If the region ALF-available flag is 1, information about the regions for ALF may be further transmitted to the decoding apparatus. In this case, the information about the regions may include region column number information indicative of the number of region columns, region row number information indicative of the number of region rows, and a uniform region flag indicating whether the regions have a uniform size. If the value of the uniform region flag is 0, the information about the regions may include region width information indicative of the width of each region and region height information indicative of the height of each region. The pieces of information include the contents described in Tables 1 and 2.

Figure 10:
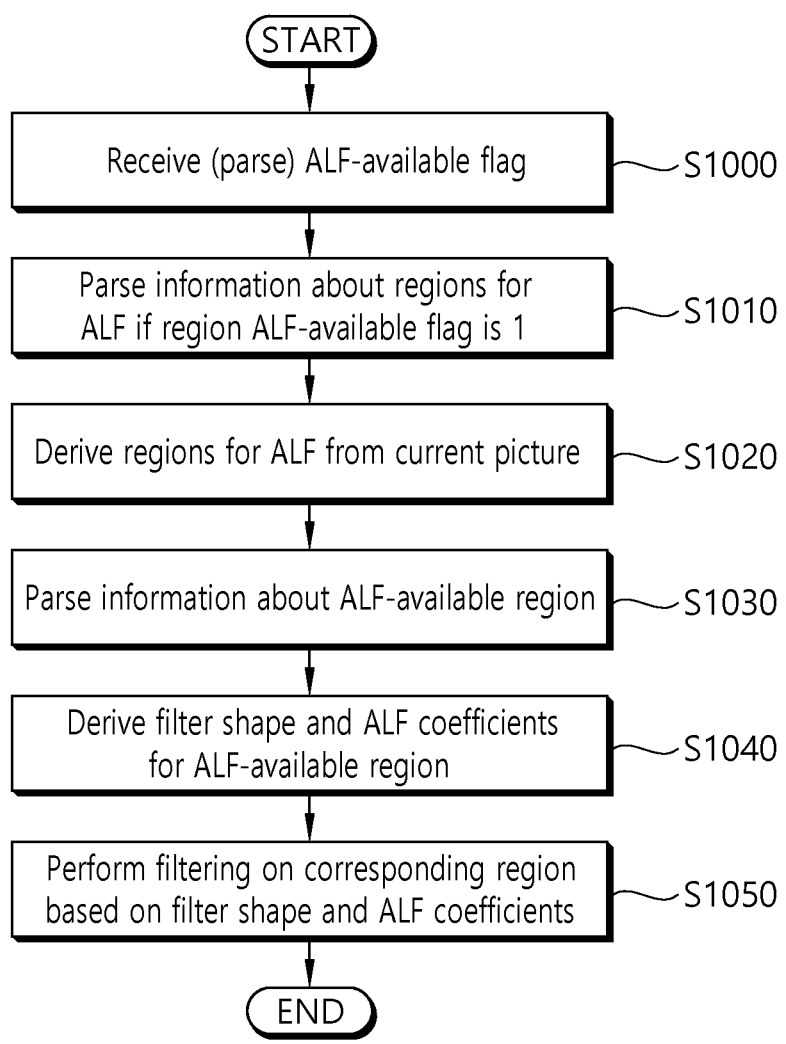
FIG. 10 schematically shows an example of a region-based ALF method according to the present invention.

FIG. 10 schematically shows an example of a region-based ALF method according to the present invention. The method disclosed in FIG. 10 may be performed by the encoding apparatus.

Referring to FIG. 10, the decoding apparatus receives and parses an ALF-available flag (S1000). The decoding apparatus may receive and parse the ALF-available flag through a bitstream received from the encoding apparatus. The bitstream may be received over a network or through a storage medium.

If the region ALF-available flag is 1, the decoding apparatus receives and parses information about regions for ALF (S1010). Information about the regions for ALF may include region column number information indicative of the number of region columns, region row number information indicative of the number of region rows, and a uniform region flag indicating whether the regions have a uniform size. In this case, +1 of the value of the syntax element corresponding to the region column number information may indicate the number of region columns, and +1 of the value of the syntax element corresponding to the region row number information may indicate the number of region rows.

If a value of the uniform region flag is 0, the information about the regions may include region width information indicative of the width of each region and region height information indicative of the height of each region. In this case, +1 of the value of a syntax element corresponding to region width information regarding a current region may indicate the width of the current region, and +1 of the value of a syntax element corresponding to region height information regarding the current region may indicate the height of the current region. The height of the current region and the width of the current region may be expressed as the number of CTUs.

The decoding apparatus derives the regions for ALF from a current picture (S1020). The decoding apparatus may derive the regions based on the region column number information, the region row number information and the uniform region flag information. Alternatively, the decoding apparatus may derive the regions based on the region column number information, the region row number information, the uniform region flag information, the region width information and the region height information.

The decoding apparatus receives and parses information about an ALF-available region (S1030). The decoding apparatus may determine whether the current region is an ALF-available region based on the information about the ALF-available region.

The decoding apparatus derives a filter shape and ALF coefficients for the current region (ALF-available region) (S1040). In this case, the decoding apparatus may explicitly or implicitly derive the filter shape and ALF coefficients for the current region. For example, the filter shape and ALF coefficients for the current region may be indicate by the encoding apparatus. In this case, the filter shape and the ALF coefficients may be indicated through a specific index value according to a predefined criterion. Alternatively, the filter shape and ALF coefficients for the current region may be determined according to a predefined criterion based on image characteristics within a corresponding region.

The decoding apparatus performs filtering on the current region based on the filter shape and the ALF coefficients (S1050).

Meanwhile, the decoding apparatus may further receive and parse information about an ALF-available CU within the current region, and may derive an ALF-available CU based on the information about the ALF-available CU. In this case, the step of filtering the current region may include performing filtering on the ALF-available CU based on the filter shape and the ALF coefficients. In this case, filtering for a CU in which the ALF is not available may be skipped.

In accordance with the present invention, subjective/objective picture quality can be improved and coding efficiency can be improved through the filtering of a reconstructed picture. Furthermore, whether or not to apply a filter, a filter shape and a filter coefficient can be adaptively determined based on a region, and thus efficient filtering suitable for the image characteristics of each region can be applied. Furthermore, the filtered picture may be stored in the memory and used as a reference picture for another picture. In this case, inter-prediction efficiency can be improved.

The above description is only illustrative of the technical idea of the present invention. Therefore, those skilled in the art may make various modifications and variations to the above description without departing from the essential characteristics of the present invention. Accordingly, the embodiments disclosed herein are intended to be illustrative, not limiting, of the present invention. The scope of the present invention is not limited by these embodiments. The scope of protection of the present invention should be construed according to the following claims.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. A picture filtering method performed by a decoding apparatus, comprising:
   receiving a bitstream including information on shape or location of regions for an adaptive loop filtering (ALF) in a current picture, a region ALF-available flag representing that the ALF is performed based on the regions for the ALF or information on shape or location of ALF-available coding unit (CU) from an encoding apparatus which is external to the decoding apparatus;
   parsing the region ALF-available flag from the bitstream;
   parsing the information on the shape or the location of the regions for the ALF from the bitstream based on a determination that a value of the region ALF-available flag is 1, wherein each of the regions for the ALF includes at least one coding unit (CU);
   deriving the regions for the ALF from the current picture based on the information on the shape or the location of the regions for the ALF;
   parsing, from the bitstream, the information on the shape or the location of the ALF-available CU included in one of the regions for the ALF;
   deriving a filter shape and ALF coefficients for the ALF-available CU based on the information on the shape or the location of the ALF-available CU; and
   performing filtering on the current region based on the filter shape and the ALF coefficients for the ALF-available CU,
   wherein the regions for the ALF are determined based on a rate-distortion (RD) cost by the encoding apparatus,
   wherein the information on the shape or the location of the regions for the ALF comprises region column number information representing a number of region columns, region row number information representing a number of region rows, and a uniform region flag representing whether each of the regions has a uniform size,
   wherein based on a determination that a value of the uniform region flag is 0, the information on the shape or the location of the regions for the ALF comprises region width information representing a width of each of the regions and region height information representing a height of each of the regions,
   wherein the number of region columns is determined by adding 1 to a value of a syntax element related to the region column number information, and
   wherein the number of region rows is determined by adding 1 to a value of a syntax element related to the region row number information.

2. The method of claim 1, wherein:
the width of each of the regions is determined by adding 1 to a value of a syntax element related to the region width information,
the height of each of the regions is determined by adding 1 to a value of a syntax element related to the region height information, and
the height of each of the regions and the width of each of the regions are expressed as number of CTUs.

* * * * *